Jan. 22, 1946.  L. H. BROWN  2,393,308
SIGHT
Filed May 2, 1944
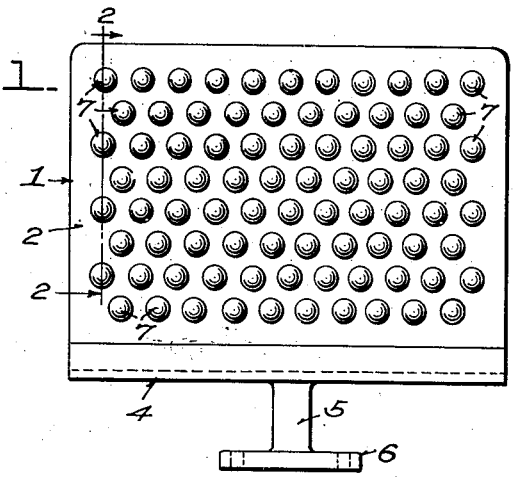
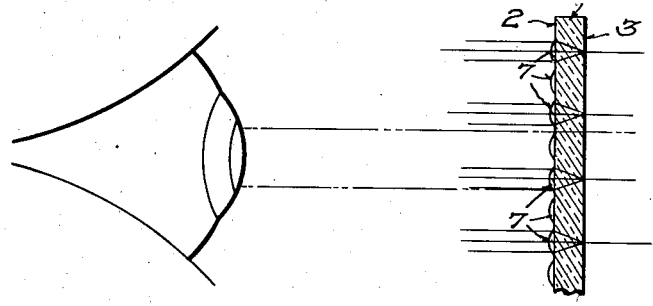
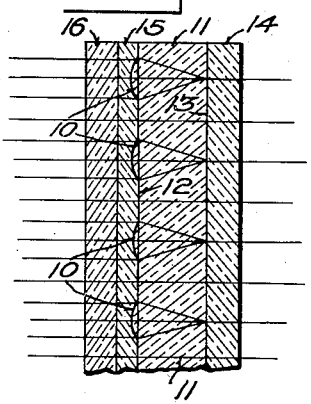
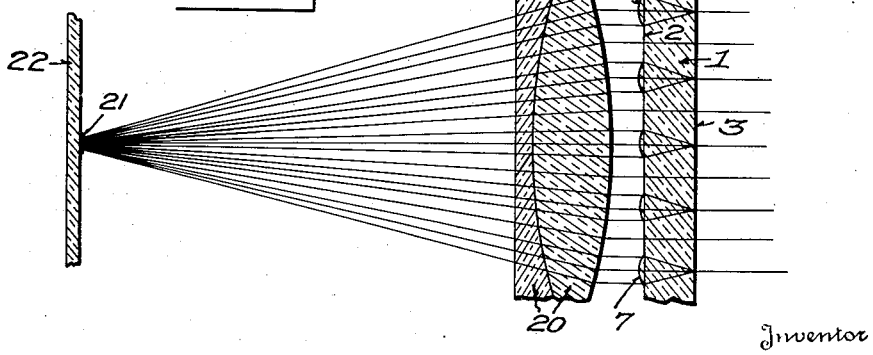
Inventor
LEO H. BROWN,
By C. E. Herrstrom & H. E. Thibodeau
Attorneys Patented Jan. 22, 1946

2,393,308

UNITED STATES PATENT OFFICE 2,393,308

SIGHT

Leo H. Brown, Glenville, Conn.

Application May 2, 1944, Serial No. 533,787

6 Claims. (Cl. 88—1)

(Granted under the act of March 3, 1883, as amended April 30, 1928; 370 O. G. 757)

The invention described herein may be manufactured and used by or for the Government for governmental purposes without the payment to me of any royalty thereon.

This invention relates to sighting means for guns, rifles, cannon, mortars, rocket projectors and other means for projecting missiles or projectiles, and referred to in a generic sense herein by the expression "gun sight."

Gun sights are known in which a collimator is used to form a virtual image of a reticle or of a figure which is superimposed upon the target in the actual sighting operation. These sights heretofore have consisted of a single converging lens with a reticle at the focus or in the focal plane of the lens, so that light emitted by or at the reticle emerges as parallel rays of light from the lens. These parallel rays of light entering the eye of the person using the sight causes him to see a virtual image of the reticle at infinity which can be superimposed upon the target without parallax.

These known gun sights have the disadvantage that the target is not viewed through the collimator. One method of viewing the target and image of the reticle of these known sights simultaneously is to look into the collimator with one eye and with the same eye look simultaneously over the collimator towards the target. Another method which is used to view the image of the reticle and the target simultaneously is to place a mirror which partially reflects light and partially transmits light at an angle to the principal axis of the collimating lens, whereby the emerging parallel rays are reflected to the eye and the eye may see the target because of the partial transparency of the reflector. These former gun sights have the further disadvantage that the bundle of parallel rays produced by them is not very large, and as a consequence the head has to be held in a more or less fixed position in sighting, or at any event no considerable movement of the head in sighting was possible, unless the converging lens was of sufficiently large area.

One of the purposes of the present invention is to obviate the above mentioned disadvantages of known sights based upon the collimator principle.

A further object of the present invention is to provide a gun sight operating upon the same general principle of a collimator but so modified as to enable the production of a large bundle of parallel rays without the necessity of using a single large lens.

Still another object of the invention is to provide a gun sight based upon the principle of the collimator which gives unlimited eye relief.

Still another object of the invention is the provision of a gun sight of the character referred to which permits both eyes to be used simultaneously in sighting, owing to the fact that the size of the bundle of collimated rays may be made large enough to provide collimater rays for both eyes simultaneously.

Gun sights according to the present invention comprise a plurality of very small converging lenses disposed in the same plane and spaced apart from each other, with a reticle or figure at the focus or in the focal plane of each of the lenses. The reticles are substantially identical and may be applied as hereinafter explained. The said small converging lenses are advantageously located on one of two parallel surfaces of a transparent plate or sheet of such thickness that reticles placed upon the other of said parallel surfaces lie within the focal planes of the said lenses. Since the said plate or sheet is transparent, and the said lenses are spaced apart, the eye of the observer receives collimated light from the reticles and light from the target through the spaces between the lenses, whereby the image of the reticles may be readily superimposed upon the target in sighting. The relation between the area of each of the said small lenses and the spaces between them is such that the pupil of the eye, even in the contracted condition occurring in bright day light use, is able to receive simultaneously collimated light rays from the lenses and light rays from the target, regardless of the position of the eye before the said lenses.

The small converging lenses referred to above are advantageously of circular form and of a diameter not exceeding three millimeters, and preferably of a diameter not exceeding two millimeters. The criterion is that the diameter of the lenses shall not be greater than the diameter of the pupil of the eye under the conditions of use and illumination. Bearing in mind that the pupils of the eyes contract under the influence of increasing illumination, a value for the diameter of the small lenses therefore should be chosen, so that the lens diameters are smaller than the diameter of the pupils of the eyes under the conditions of illumination under which the sights, according to the present invention, are used.

As referred to above, the relation between spaces between the small converging lenses and the diameter or area of the circle or other configuration forming the periphery of the lenses is such that the pupils of each of the eyes always simultaneously receive light rays from the target and parallel rays from the reticles, the former proceeding from the target through the spaces between the lenses and the latter originating at the reticles and brought into parallelism by the small lenses.

The drawing accompanying this description of the invention illustrates two embodiments of the invention and means for applying the reticles at the foci or in the focal planes of the small lenses. In this drawing in which the same characters of reference indicate the same or corresponding parts, Fig. 1 is front elevation of the sight;

Fig. 2 is a cross section on the line 2—2 of Fig. 1 and showing the position of the eye or eyes in sighting;

Fig. 3 is a partial enlarged sectional view similar to Fig. 2 of the optical system of another modification of the invention;

Fig. 4 is a partial sectional view illustrating how the reticles or figures may be applied in the focal planes or at the foci of the small lenses of the two embodiments of the sights illustrated in the drawing.

Referring now to the embodiment of the invention illustrated in Figs. 1 and 2, a transparent glass or plastic plate 1 with oppositely disposed flat parallel faces or surfaces 2 and 3 is mounted and secured in a groove in base 4 of the sight. A standard 5 joins the base 4 with the pedestal 6, the latter serving for mounting the sight in position.

The small converging lenses 7 with the dimensions given above are cemented with a suitable transparent cement upon the surface 2 of plate 1, and are spaced apart as hereinbefore described. The principal axes of these lenses are parallel. A reticle for each of the lenses is applied to the surface 3 of plate 1 where each principal axis intersects the surface. The reticle may, of course, extend around each principal axis as a center. The surface 3 is coincident with the focal plane of the lenses 7, whereby light from the reticles or from points in the surface 3 emerges from lenses 7 as parallel rays.

In the modification of the invention illustrated in Fig. 3, lenses 10 correspond to lenses 7 and transparent plate 11 corresponds to plate 1. Surfaces 12 and 13 of plate 11 correspond to surfaces 2 and 3 respectively. However, in this modification of the invention, three additional transparent plates 14, 15 and 16 are employed. Plate 14 serves as a cover plate for the reticles which are located in the interface between plates 11 and 14. A plate 15 of transparent plastic material conforming with the shape and disposition of the lenses 10 on the plate 11 is applied over the said lenses. The index of refraction of this plate 15 is less than the index of refraction of plate 11. Transparent plate 16 serves as a cover plate for plastic plate 15. The principal foci of the lenses lie on or in the surface 13 of the palte 11, and the principal axes are substantially parallel. The lenses are spaced in the manner referred to in earlier parts of this description of the invention.

Referring now more particularly to Fig. 4, which illustrates the manner and means for applying the reticles at the foci of the small lenses, plate 1 and lenses 7 shown therein are parts identical with parts having the same reference characters in Figs. 1 and 2, except that here a light sensitive fine grain emulsion or composition extends over the surface 3. An achromatic collimating lens is indicated by the numeral 20. A single master pattern 21 of the reticle is carried on a plate 22, and is illuminated by any suitable means. Lens 20 is so placed with reference to the pattern 21 that rays of light pass from it through lens 20 and are rendered parallel to the principal axis of the lens 20. These parallel rays then enter the lenses 7 and are brought to focus at the surface 3 where each lens 7 forms a real image of the master pattern 21. The real images are recorded photographically by the light sensitive emulsion or composition. After developing and drying of the exposed emulsion, those parts of the emulsion directly behind the spaces between the lenses are removed, whereby each lens 7 has behind it developed and dried emulsion carrying the reticle symmetrically with respect to its principal axis.

It will, of course, be appreciated from the foregoing description, and accompanying drawing that the plurality of lenses 7 lie in the same plane, or that their poles lie in the same plane. The same conditions prevail in the case of the plurality of lenses 10.

I claim:

1. A gun sight comprising a plurality of converging lenses, each of a size less than the size of the pupil of the eye under conditions of use of the sight, the principal axes of the said lenses being substantially parallel; a reticle at the focus of each of said lenses, said reticles being on the same side of said lenses and substantially identical; the said lenses being so spaced apart and mounted that light rays from a distant target on the same side of the lenses as the said reticles may pass between the lenses to the eye of an observer on the opposite side of the said lenses without passage through them, whereby the target may be seen through the spaces between the lenses; and the area of each of said lenses and the spaces between them being such that the pupil of the eye of the observer is able to receive simultaneously collimated light rays through the said lenses from said reticles and light rays from the distance target, regardless of the position of the eye of the observer before the lenses.

2. A gun sight according to claim 1 in which the converging lenses are not more than three millimeters in diameter.

3. A gun sight according to claim 1 in which the converging lenses are not more than two millimeters in diameter.

4. A gun sight comprising a plurality of converging lenses of substantially equal focal length, with substantially identical reticles at the focus of the lenses, with the optical axis of each lens substantially parallel to the optical axes of the other lenses, the said lenses being mounted with clear spaces between them and the said lenses and the spaces between them being so dimensioned that the pupil of the eye of the observer is able simultaneously to receive collimated light rays through the lenses from said reticles and view the target through said spaces regardless of the position of the eye of the observer before the lenses.

5. A gun sight according to claim 4 in which the converging lenses are not more than three millimeters in diameter.

6. A gun sight according to claim 4 in which the converging lenses are not more than two millimeters in diameter.

LEO H. BROWN.